Patented Feb. 20, 1940

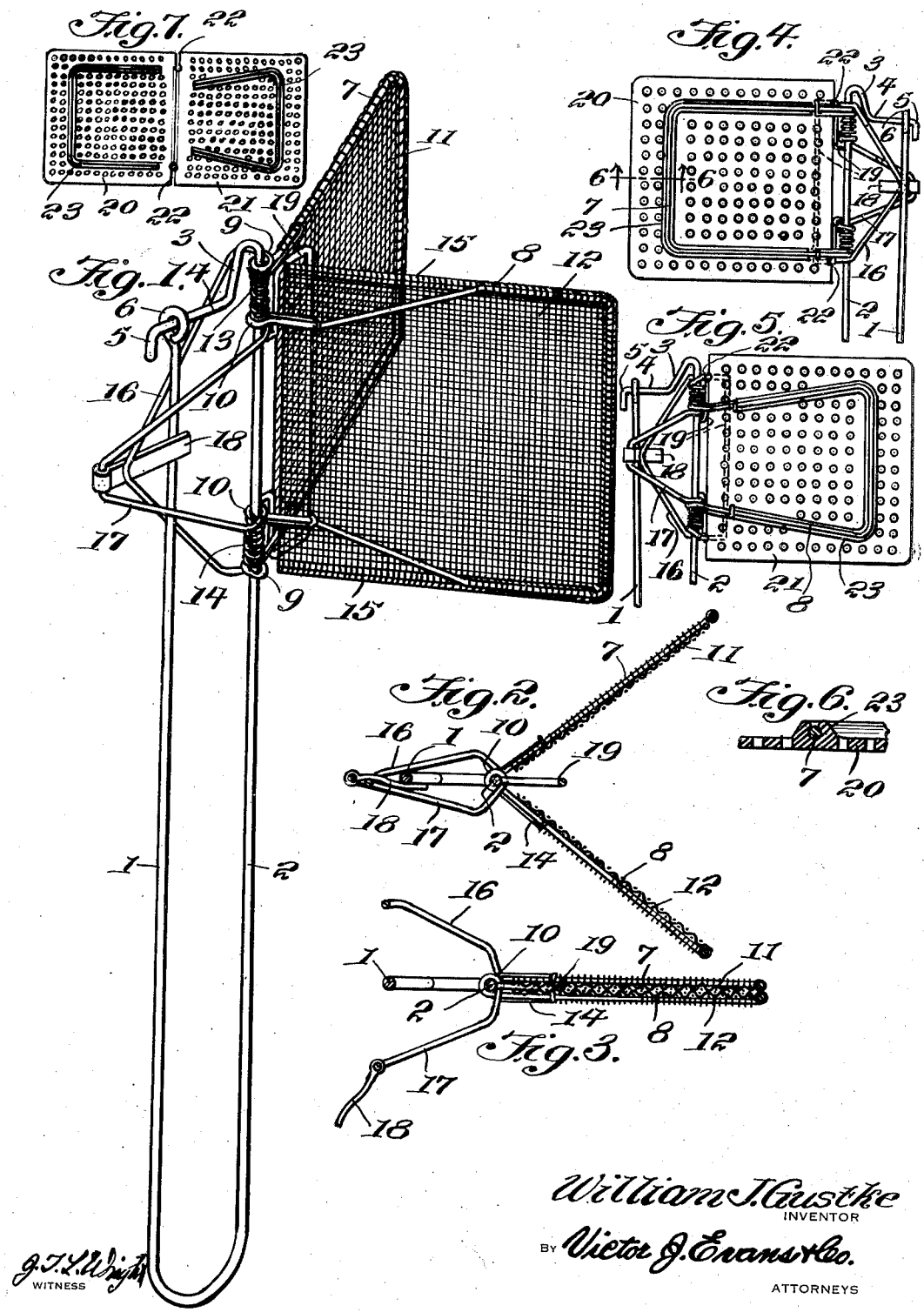

2,191,126

UNITED STATES PATENT OFFICE 2,191,126

INSECT CATCHER

William J. Gustke, Parkersburg, W. Va.

Application July 19, 1939, Serial No. 285,429

7 Claims. (Cl. 43—135)

This invention relates to insect catchers, and its general object is to provide a catcher of the swatter type, but distinguishes from the so-called fly swatter now in general use, in that my catcher includes a pair of companion movably mounted members for catching and crushing insects between the same, thus avoiding spotting walls, furniture and the like, as well as makes it possible to kill insects that are flying or have landed on an uneven surface, and then dropping them from the device into a wastebasket or the like.

A further object is to provide a handled insect catcher that is spring actuated for instant operation, it being held in open position by trigger means that is releasable by slight pressure on the handle, thereby flies or other fast flying insects can be caught on the wing with minimum effort on the part of the user.

Another object is to provide an insect catcher, of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a perspective view of one form of my device in open or set position.

Figure 2 is a horizontal sectional view taken through Figure 1.

Figure 3 is a similar sectional view but with the device in closed or released position.

Figure 4 is a side elevation of a modified form.

Figure 5 is a view of the opposite side of the form shown in Figure 4.

Figure 6 is a sectional view taken approximately on line 6—6 of Figure 4, looking in the direction of the arrows.

Figure 7 is a top plan view of the sheet rubber body for the swatting members of the modified form.

Referring to the drawing in detail, and particularly to the form shown in Figures 1 to 3 inclusive, it will be noted that the handle is made up of a single strand of relatively stiff wire looped upon itself substantially midway its ends, to provide a pair of spaced parallel portions 1 and 2. The portion 2 is bent at its outer end reversely upon itself to provide an outwardly inclined portion 3 and a straight portion 4 disposed at right angles with respect to the portion 1, as well as terminates in a portion 5 disposed parallel to the portion 2. The portion 4 provides a guide for slidably receiving the eyed free end 6 of the portion 1, and the portions 3 and 5 provide stops for the eyed free end to limit its movement, as will be apparent upon inspection of Figure 1. By that construction, it will be further apparent that the portion 1 of the handle is movable toward and away from the portion 2 but is normally held parallel therewith, due to the inherent resiliency of the strand providing the handle.

The swatting members include frames 7 and 8 of substantially rectangular formation, and each frame is made from a single strand of wire. The strand of the frame 7 is coiled about the parallel portion 2 as at 9, while the strand of the frame 8 is coiled about the portion 2 as at 10 for disposal inwardly or between the coils 9 which like the coils 10 provide bearing eyes for swinging movement of the frames 7 and 8 on the portion 2, and for disposal of the frames laterally thereof, as clearly shown in Figure 1.

The frames 7 and 8 have soldered or otherwise secured thereto pieces of wire mesh material 11 and 12 respectively, providing bodies for the swatting members and said members are urged toward each other to perform their swatting function as well as held together in closed position, by coil springs 13 and 14 sleeved upon the parallel portion 2 between the bearing eyes 9 and 10. The springs have one of their ends secured to the frame 7 while the opposite ends are secured to the frame 8.

It will be noted that the strand of wire which makes up the frame 8 is inwardly directed from the outer edges of the body 12 for disposing the bearing eyes 10 inwardly of the eyes 9, but the inner portions of the said edges of the body 12 are crimped and soldered to provide reinforcing beads 15.

From the bearing eyes 9, the strand which makes up the frame 7 is directed rearwardly and at an outward inclination for disposal upon one of the sides of the parallel portions 1 and 2 and shaped to provide a substantially triangular portion 16, while the strand which makes up the frame 8 is likewise directed rearwardly at an outward inclination for disposal upon the opposite sides of the parallel portions 1 and 2, and is also shaped to provide a substantially triangular portion 17. The portions 16 and 17 are of a length to extend beyond the parallel or handle portion 1 when the eyed free end thereof is engaged with the bent end portion 5, and the triangular portion 17 is slightly longer than the portion 16, as well as has pivotally mounted on the apex end thereof a lever 18 providing a keeper for engagement with the apex end of the portion 16, and the handle portion 1, for holding the swatting members against the action of the coil springs, in open or set position, as best shown in Figure 1.

It is believed from the foregoing and the disclosure in the drawing that the operation of my device will be obvious, but it might be mentioned that when it is desired to dispose the swatting members in open or set position, the triangular portions 16 and 17 are moved toward each other, thence the lever 18 is disposed about the apex end of the portion 16 and the handle portion 1 is moved for engagement with the free end of the lever. In order to release the swatting members from their set position, the handle member 1 which acts in the capacity of a trigger is moved toward the member 2 for disposing the lever out of engagement with the portion 1 and when so disposed, the swatting members will be snapped to closed position by the action of the springs 13 and 14.

The swatting members are held against undue swinging movement on the handle portion 2, by a frame member 19 having its ends fixed to the handle portion 2 for the disposal of the frame member 19 between the swatting members, as best shown in Figure 2.

The operating mechanism of the form of Figures 4 to 7 inclusive is identical to that of Figures 1 to 3, and the only difference between the two forms, lies in the swatting members which instead of having wire mesh bodies there is provided a single sheet rubber member of rectangular formation folded transversely midway its ends to provide bodies 20 and 21 for the frames 7 and 8. The body member is slotted as at 22 at the ends of the fold line, for receiving the ends of the frame member 19 and the bodies or sections 20 and 21 have channeled ribs 23 formed thereon for fittingly receiving the frames 7 and 8, for securing the body member thereto, as will be apparent upon inspection of Figure 6. The bodies 20 and 21 are perforated to allow for the free passage of air therethrough so that they will not be retarded when moving to swatting position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An insect catcher comprising a handle including portions connected together for relative movement, a pair of spring pressed companion swatting members swingingly mounted on one of said portions and urged toward each other to swatting position, and keeper means engageable with the other handle portion for holding the swatting members in open position and releasable therefrom upon gripping said handle portions for moving the same toward each other.

2. An insect catcher comprising a handle including portions connected together for relative movement and for normal disposal parallel with each other, a pair of spring pressed companion swatting members swingingly mounted on one of said portions and urged toward each other to swatting position, keeper means carried by one swatting member and engageable with the other swatting member and other handle portion for holding the swatting members in open position, and said keeper means being releasable upon gripping said handle portions for moving the same toward each other.

3. An insect catcher comprising a handle including portions connected together at one end for relative movement and for normal disposal parallel with each other, a pair of spring pressed companion swatting members swingingly mounted on one of said portions and extending laterally therefrom, said swatting members being urged toward each other to swatting position, keeper means carried by one swatting member and engageable with the other swatting member and other handle portion for holding the swatting members in open position, and said keeper means being releasable upon gripping said handle members for moving the same toward each other.

4. An insect catcher comprising a handle including portions connected together at one end for relative movement and for normal disposal parallel with each other, an eyed free end for one of said portions, guiding means at the free end of the other handle portion and having the eyed end slidably mounted thereon, a pair of spring pressed swatting members swingingly mounted on the latter handle portion and urged toward each other to swatting position, keeper means engageable with the eyed handle portion for holding the swatting members in open position and being releasable therefrom upon gripping said handle portions for moving the same toward each other.

5. An insect catcher comprising a handle including portions connected together for relative movement, a pair of companion swatting members each including a frame, bearings for each of said frames and mounted on one of said handle portions for swinging movement of the swatting members, springs for each of said frames for urging the swatting members toward each other to swatting position, keeper means carried by one of said frames and engageable with the other frame and the other handle portion for holding the swatting members in open position, and said keeper means being releasable upon gripping said handle portions for moving the same toward each other.

6. An insect catcher comprising a handle member including portions connected together at one end for relative movement, a pair of swatting members each including a frame, a wire mesh body for each swatting member and fixed to its frame, bearings for each frame and mounted on one of said handle portions for swinging movement of the swatting members, springs sleeved on the latter handle portion and connected to the swatting members for urging the same to swatting position, means to limit the swinging movement of the swatting members to their swatting position, substantially triangular shaped portions included in each frame and extending therefrom for disposal upon opposite sides of the handle portions, a keeper pivotally secured to one of said triangular shaped portions and engageable with the other triangular shaped portion and the other handle portion for holding the swatting members in open position, and said keeper being releasable upon gripping said handle portions for moving the same toward each other.

7. An insect catcher comprising a handle including portions connected together at one end for relative movement, a pair of companion swatting members, each including a frame, a sheet rubber body member folded midway its ends to provide a body for each swatting member, channeled groove ribs formed on each body and having the frames mounted in the channels thereof for securing the bodies to the frames, said bodies being perforated, bearings for each frame and mounted on one of said handle portions for swinging movement of the swatting members, springs sleeved on the latter handle portion and connected to the swatting members for urging the same to swatting position, means to limit the swinging movement of the swatting members to their swatting position, substantially triangular shaped portions included in each frame and extending therefrom for disposal upon opposite sides of the handle portions, a keeper pivotally secured to one of said triangular shaped portions and engageable with the other triangular shaped portion and the other handle portion for holding the swatting members in open position, and said keeper being releasable upon gripping said handle portions for moving the same toward each other.

WILLIAM J. GUSTKE.